(12) United States Patent
Douer

(10) Patent No.: US 10,211,671 B2
(45) Date of Patent: Feb. 19, 2019

(54) AUXILIARY A/C POWER SUPPLY SYSTEM FOR VENDING MACHINES

(71) Applicant: Morris Douer, Nanuet, NY (US)

(72) Inventor: Morris Douer, Nanuet, NY (US)

(73) Assignee: KeepvendingUSA Holdings LLC, Nanuet, NY (US)

( * ) Notice: Subject to any disclaimer, the term of this patent is extended or adjusted under 35 U.S.C. 154(b) by 250 days.

(21) Appl. No.: 15/080,234

(22) Filed: Mar. 24, 2016

(65) Prior Publication Data

US 2016/0285308 A1    Sep. 29, 2016

Related U.S. Application Data

(60) Provisional application No. 62/177,812, filed on Mar. 24, 2015.

(51) Int. Cl.
| | | |
|---|---|---|
| H02J 9/06 | (2006.01) | |
| H02J 7/00 | (2006.01) | |
| H02J 7/02 | (2016.01) | |
| G07F 17/00 | (2006.01) | |
| H02J 7/34 | (2006.01) | |
| H02J 1/00 | (2006.01) | |

(52) U.S. Cl.
CPC .......... *H02J 9/062* (2013.01); *G07F 17/0071* (2013.01); *G07F 17/0078* (2013.01); *H02J 7/0047* (2013.01); *H02J 7/0068* (2013.01); *H02J 7/022* (2013.01); *H02J 7/34* (2013.01); *H02J 2001/006* (2013.01)

(58) Field of Classification Search
CPC ........ H02J 7/0047; H02J 7/0068; H02J 7/022; H02J 7/34; H02J 9/062; G07F 17/0071; G07F 17/0078
USPC .......................................................... 307/20
See application file for complete search history.

(56) References Cited

U.S. PATENT DOCUMENTS

| | | | | |
|---|---|---|---|---|
| 6,680,547 | B1 * | 1/2004 | Dailey | H02J 3/28 307/24 |
| 2007/0035290 | A1 * | 2/2007 | Schweigert | H02J 3/32 324/142 |

* cited by examiner

*Primary Examiner* — Thomas Skibinski

(57) ABSTRACT

An auxiliary A/C power supply system for use with a high power vending machine requiring more current at start up than is provided by a standard 110 volt, 15-16 amp service. The system includes an A/C controller including a microprocessor that selectively engages an inverter powered by a battery bank to provide auxiliary power on a cycle determined by the A/C controller according to the type of vending machine and according to environmental conditions such as ambient temperature, altitude and battery charge.

16 Claims, 9 Drawing Sheets

AUXILIARY A/C POWER SUPPLY SYSTEM FOR VENDING MACHINES

RELATED APPLICATION

This application claims the benefit of priority under 35 § 119(e) to U.S. Provisional Patent Application No. 62/177,812, filed on Mar. 24, 2015 and incorporated by reference in its entirety herein.

TECHNICAL FIELD

This disclosure pertains to an auxiliary power supply system for machines having power demands that may periodically exceed the level of power supplied by a conventional 110 volt A/C power source, and more particularly, for vending machines having such power demands.

BACKGROUND

In the vending and food industry, speed of delivering a vended product is very crucial, especially products requiring high energy processing such as a microwaved product. A high powered commercial microwave typically requires a 220 volt outlet and may consume as many as 2,000 Watts. An associated problem is that very few vending locations can routinely provide 220 volt outlets. One conventional option for dealing with this problen is to provide a 3,800 watt, 120 volt outlet in combination with a high powered 6 KVA step Up Transformer (110 V to 220 V). However, this option may generate significant expense. A new outlet will most likely be required, which must be done installed by a certified electrician with proper building code permits. In many cases, other structural modifications will be required. For example, walls may need to be broken into and drop ceilings removed, depending on the location of the main electrical panel relative to the outlet where the machine needs to be installed. This is both time consuming and an expensive proposition for the installation of a vending machine. Moreover, building management may not allow such modifications.

SUMMARY

Briefly, aspects of the present disclosure are directed to an auxiliary A/C power supply system for machines having power demands that may periodically exceed the level of power supplied by a conventional 110 volt A/C power source (for example, powering up a 4,000 watt vending machine on a single vending outlet rated at 15-16 amps. The disclosed system enables the vending machine to be operated from single 110 volt power source available at the vending location without the need for any changes to the main electrical panel.

By way of example, aspects of the auxiliary A/C power supply system are described with application to two types of vending machines. A first application is described with reference to a commercial microwave popcorn vending machine including two magnetron elements, power is provided to one magnetron of the microwave oven from the auxiliary A/C power supply system while a second magnetron of the microwave oven receives grid power. The microwave oven would normally require a 3600 watts electrical feed, but operates from a 110 volt outlet rated at 15-16 amps with additional power provided by the auxiliary A/C power supply system.

According to other aspects of the present disclosure, the auxiliary A/C power supply system is described with application to a commercial ice cream machine having high power components including a beater motor, heavy duty compressor and condenser fan motor. In this application, an initial start-up cranking power may be provided by the auxiliary A/C power supply system while grid power is initially off. In this case, peak power demand at start-up may be as much as 300% of the running power demand. Upon the completion of start-up, the auxiliary A/C power supply system is operative to turn the grid power on and switch off the auxiliary power seamlessly without any interruption. In this case, a peak initial cranking demand may be 3600 watts at 110 volts, while the running demand is 1800 watts in at 110 volts. In this case, power demand may be fulfilled by a conventional 110 volt outlet rated at 20 amps.

Thus, the disclosed auxiliary A/C power supply system for example can enable a vending/food service operator to easily install a high powered machine such as a commercial soft serve ice cream vending machine with an initial start-up amp draw of 35 amps on an ordinary pre-existing 110 volt outlet rated at 15-16 amps only, without the need to change wiring or breakers. Alternatively, the disclosed auxiliary A/C power supply system can enable a vending/food service operator to easily install a commercial high powered microwave vending machine rated at 4,000 watts on a conventional 110 volt outlet rated at amps.

The disclosed auxiliary A/C power supply provides auxiliary A/C start-up power via a high powered inverter and a bank of deep cycle batteries, while running power is provided from Grid power. Power can be switched between these two sources without interruption via a smart power pack with smart relays. The smart power pack in effect acts as power bridge between the ordinary 110 volt outlet rated at 15-16 amps and a high powered vending machine which may require a start-up current of 35 amps. The smart power pack will automatically detect the current demand (for example, by means of a current sensor such as a Hall effect sensor), and if in excess of the capability of grid power will the current demand via through the deep cycle battery bank and high powered inverter of the auxiliary A/C power supply. With instruction from an A/C power controller microprocessor, the smart power pack will determine how long to provide starting power and thereafter switch to grid power for example by actuating a grid power control relay.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect." The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

As used herein, directional terms as may be used such as "horizontal," "vertical," "proximal," "distal," "front", "rear", "left," "right," "inner," "outer," "interior" and "exterior" relate to an orientation of the disclosed system, and do not specify permanent, intrinsic features or characteristics of the device.

Figure 1:
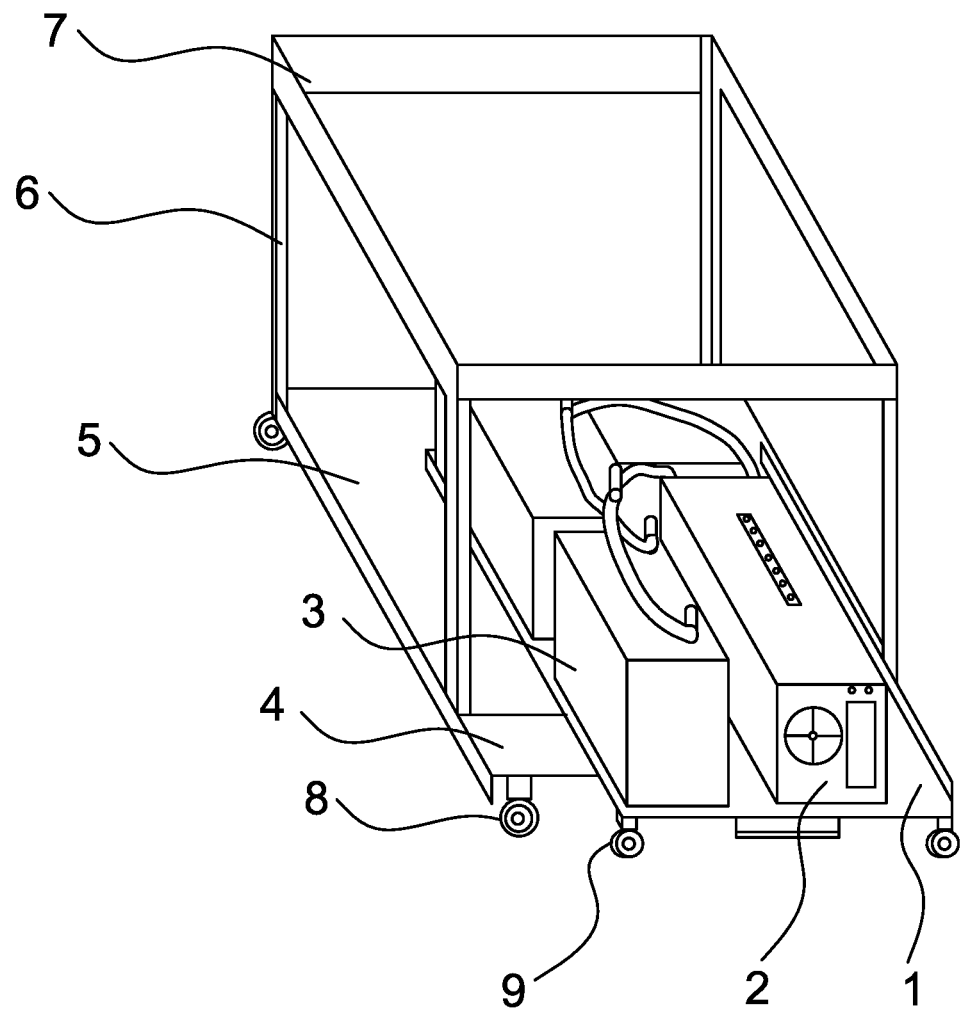
FIG. 1 is a schematic diagram showing an exemplary auxiliary A/C power supply system according to aspects of the present invention.

In accordance with aspects of the present disclosure, we first describe a physical configuration of components included in an auxiliary A/C power supply system according to aspects of the present disclosure. FIG. 1 illustrates exemplary base and frame for the auxiliary A/C power supply system as may be used in conjunction with a wide variety of any type of vending machines having various high-amperage requirements. Examples include microwave popcorn vending machines, other vending machine requiring the use of a high-power microwave oven, and soft-serve ice cream and yogurt vending machines.

As illustrated in FIG. 1, the base and frame include a slidable power drawer 1 designed to slide in and out while carrying other components of the auxiliary A/C power supply system. These other components may include, for example, a high power inverter/charger 2 (for example, capable to provide, for example, 3,000 to 4,000 running watts and 9,000 surge watts, and withstanding high wattage peaks for up to 20 seconds) and a deep cycle battery bank 3 (including, for example, 12 volt or 24 volt deep cycle batteries). A lower base protrusion 4 of a lower base 5 extends, for example, to accommodate a main door of the vending machine.

The lower base 5 of the frame carries the power drawer 1 and supports support beams 6 which position an upper structure 7 configured to receive a variety of different types of vending machines. The unit may be easily moved by caster wheels 8 when the power drawer 1 is refracted, and by caster wheels 8, 9 when the power drawer 1 is extended.

Figure 2:
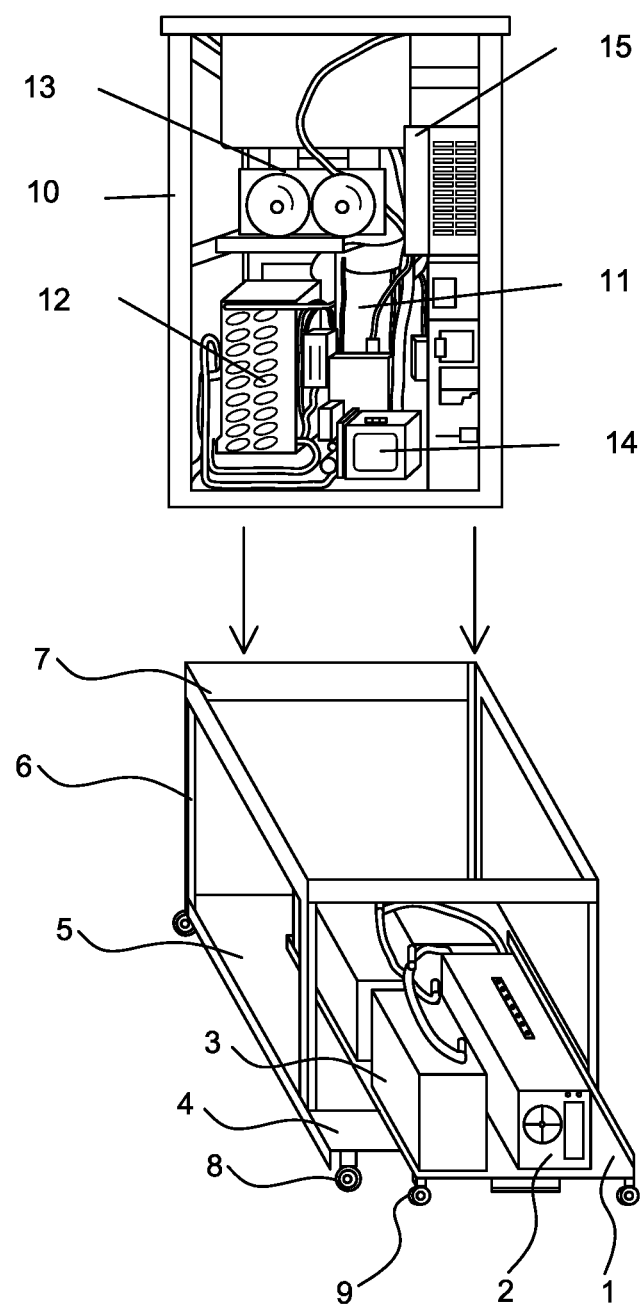
FIG. 2 is a schematic diagram showing the auxiliary A/C power supply system of FIG. 1 in combination with an exemplary ice cream vending machine.

FIG. 2 illustrates the base and frame of FIG. 1 configured for use in an exemplary soft serve ice cream vending machine 10 including a large compressor 11, a large condenser 12 with cooling fan motor, beaters 13 connected to a large beater motor and a control box 15. While the vending machine 10 as illustrated in FIG. 2 includes a smart relay 14 for switching vending machine power between grid power and inverter power, the smart relay 14 could alternatively be positioned within the base and frame of FIG. 1.

Figure 3:
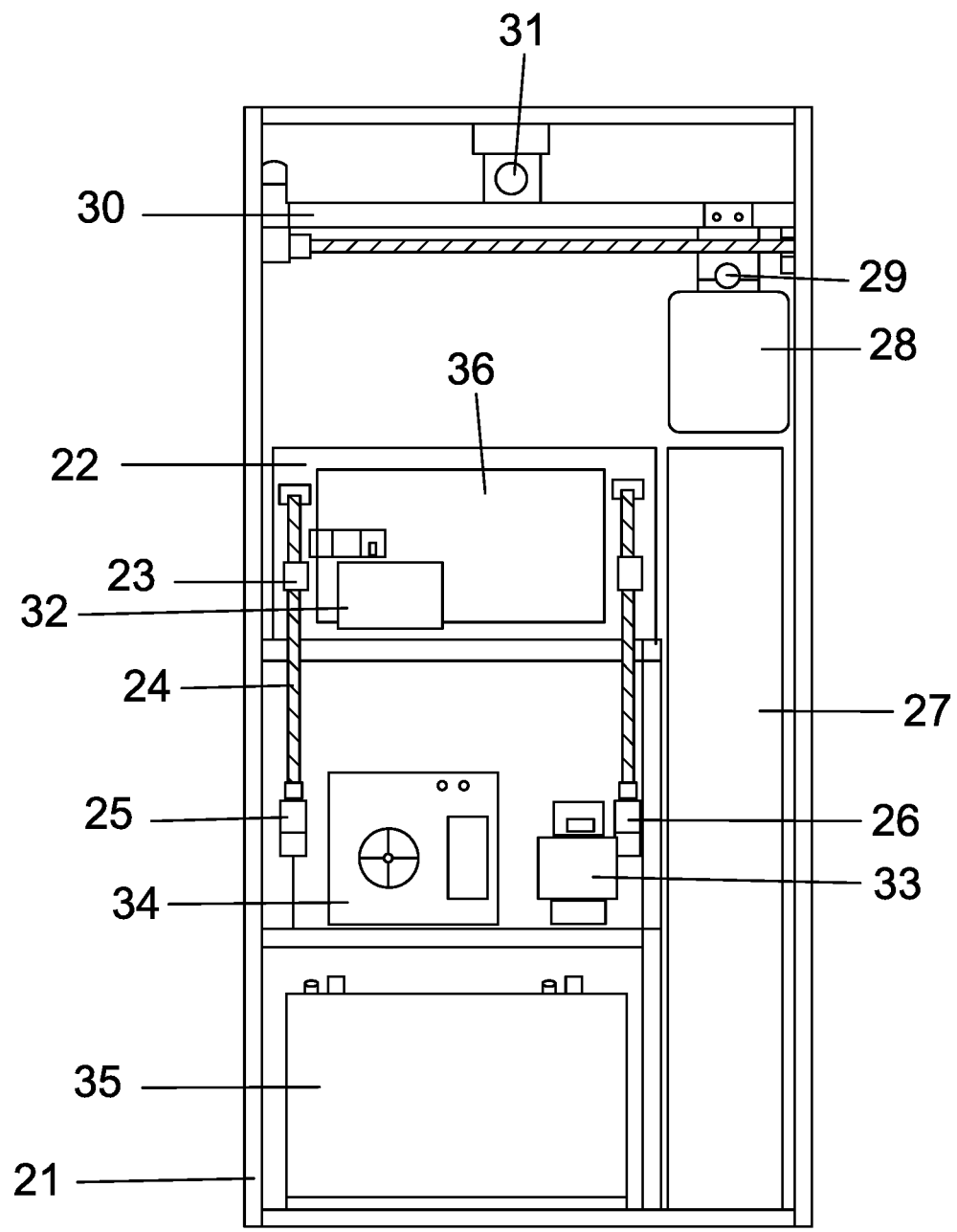
FIG. 3 is a schematic diagram showing the auxiliary A/C power supply system of FIG. 1 in combination with an exemplary popcorn vending machine

FIG. 3 shows an exemplary microwavable popcorn robotic vending machine that integrates the auxiliary A/C power supply system in a structural frame 21 formed from, for example, aluminum T-slots for ease of assembly. The microwavable popcorn robotic vending machine components include a microwave oven 36 with a door 22 configured to slide up and down by means of, for example, Acme nuts and guides 23 coupled with Acme screws 24 which are controllably turned via motors and encoders 25, 26. An optional multi-sectional cavity 27 is provided for storing a stack of different flavor microwavable popcorn bags.

Each section in the multi-sectional cavity 27 may, for example, have a capacity of holding approximately 85 bags. A standard-size multi-sectional cavity 27 may incorporate 6 sections. In operation, a picker 28 is manipulated to enter one of the sections to suction out one of the microwavable popcorn bags. A motor 29 with encoder will guide the picker 28 down into the section, using an infrared sensor for detecting the bag. Power may be retractably carried to the picker 28 by a power wire carried on a reel. Encoder pulses generated as the picker 28 is guided down the section can be used to indicate a number of microwavable popcorn bags left in the cavity to a main controller of the machine.

Encoder motor 30 in combination with an assembly of Acme rod and screw for enable the picker 28 to travel from the 27 multi sectional cavity to a drop off station. Encoder motor and assembly 31 enable the picker 28 to travel between the different sections of the cavity 27. The picker 28 will release the bag which will fall into onto a motorized plank 32 which will guide bag into the microwave cavity.

Motorized plank 32 will guide the microwavable popcorn bag into the microwave. The picker 28 release by operation a vacuum pump 33, which is connected to the picker suction cup, through a vacuum hose which is in a coil form inside a picker housing, thus creating suction at the bottom of the picker to lift the microwavable popcorn bag.

An inverter 34, such as for example, a 3,000 to 4,000 watt true-sign inverter, is operated to energize one of two large magnetrons in the microwave (preferably 1200 cooking watts each) for a speedy cooking cycle that may last less than a minute. The inverter is powered by a deep cycle battery bank 35, having a voltage potential of, for example 12 to 24 V, and storing, for example, a potential energy of at least 500 amp-hours. Inside the microwave oven 36 there is preferably a longitudinal motorized kicker, which will operate to kick out the fully cooked bag out of the microwave oven once microwave door 22 is fully open.

A microprocessor (not shown) that is part of an A/C controller of the auxiliary A/C power supply system of FIG. 1 is programmable in conjunction with several relay control boards (see, for example, boards 714 and 716 of FIG. 7) to control a range of up to, for example, 256 relays to operate the AC power supply system. The A/C controller transmits two forms of commands, e.g., "activate" and "deactivate", to control the relays. While all positions are identified logically as relays, some may be used for receiving control signals by other components: For example, "phantom" relay 248 (in Tables 1(A) and 2(A)) is used as a position for sending control signals to the vending machines (for example, to initiate a "cook cycle" for popcorn vending machines or an "ice cream freeze" cycle for soft serve ice cream vending machines.

Tables 1(A)-1(D) illustrate exemplary programmable control instructions that are provided to the A/C controller of the auxiliary A/C power supply system of FIG. 1 for use with the exemplary ice cream vending machine ("freezer mode").

As illustrated in section (1) of the control specification provided by Table 1(A), an exemplary mode for phantom relay 248 is defined as "freezer" in order to set up a control program of the A/C controller for the purpose of ice cream making. In section (2), a battery relay #5 is identified for activating a charging mechanism of the battery bank. Relay #5 will be instructed to turn to OFF position once Relay 248 is called for, in order to decouple a battery charger from the batteries so that a load may be provided by the batteries to a compressor of the ice cream vending machine for freezing the ice cream. By decoupling the battery charger while A/C power is provided to the ice cream vending machine by the batteries and an inverter coupled between the batteries and the machine, potential damage to the batteries and/or inverter can be avoided.

TABLE 1(A)

```
\Popcorn Machine Diagram\VMC v19.0 - 556 tech\HardwareProfile.h
/*******************************************************************
*****************
FileName:        HardwareProfile.h
Processor:       PIC18 USB Microcontrollers
Compiler:        Microchip C18
Written For:     556 Tech Ltd.
********************************************************************
**************/
#ifndef          HARDWARE_PROFILE_H
#defineHARDWARE_PROFILE_H
/**DEFINITIONS
********************************************************/
#defineYES 1
#defineNO 0
#defineSPILLOVER 1
#defineTESTMOTORS 0
#defineFREEZER 1
#defineCOOKER 2
#defineCLOCK_FREQ 48000000
#defineGetSystemClock ( ) CLOCK_FREQ
/** PREDEFINED MAX TIME FOR TEST ALL MOTORS
*********************************************************/
#define TIME_FOR_TEST_MACHINE    60   //<== Adjust this number in seconds multiple.
/** DEFINITION OF THE FUNCTIONALITY OF RELAY 248 COMMAND
*********************************************************/
(1)      # define RELAY_248_FUNCTIONALITY FREEZER     // Selects machine
                                Profile
                                // FREEZER or COOKER
/** BATTERY RELAY NUMBER DEFINITION
*********************************************************/
(2)      #define BATTERY_RELAY 5
/** DEFINITION OF THE DELAY FOR CHARGE BATTERY AFTER A MACHINE CYCLE
*********************************************************/
(3)      #define DELAY_4BATT_CHARGE_AFTER_CYCLE    30   // This number given in Seconds.
```

In section (3) of the control specification provided by Table 1(A), a delay in which time the relay sensor mechanism senses the current applied needs is calculated and programmed. Since deep cycle batteries tend to create an uneven voltage immediately after a load is applied, an average time lapse of the battery bank is determined (for example, by direct measurement or according to manufacturer specification) that would be required before achieving a stable voltage. As shown by way of example in section (3), the delay is 30 seconds.

In section (4) of the control specification provided by Table 1(B) below, the A/C controller is instructed to measure the battery bank voltage on a continuing basis, to deactivate relay #5 if the battery voltage exceeds 14.5 Volts, and to re-activate relay #5 when battery voltage is less than 12.5 Volts. One of skill in the art will recognize that these thresholds may vary in accordance with the characteristics and specifications of the battery bank.

the ice cream machine. In the case, for example, that this temperature rises above 2 degrees Celsius, the A/C controller may be instructed to generate an error message. As a second example, a second maximum temperature value may be defined for a minimum measured temperature in the freezing cylinders of the ice cream machine. For example, if the temperature exceeds −20 degrees Celsius in this case, an error message will be triggered.

In section (6) of the control specification provided by Table 1(B), relays 253 through 256 in our example may be used as emergency relays. One emergency relay application could be to interrupt the supply of 24 Volts used by motor control relays, thereby shutting down these motors in response to a malfunction in the system.

In section (7) of the control specification provided by Table 1(C) below, a definition is provides as to which motors will work simultaneously and which motors will work in

TABLE 1(B)

```
\Popcorn Machine Diagram\VMC v19.0 - 556 tech\HardwareProfile.h
        // between 6 and 150
/** BATTERY MAXIMUM AND MINIMUM VOLTAGES DEFINITION
***************************************************/
(4)  #define MAXIMUM_BATT_VOLTAGE        14.5
     #define MINIMUM_BATT_VOLTAGE        12.5
/** TEMPERATURE MAXIMUM VALUE DEFINITION
***************************************************/
(5)  #define MAX_TEMP_A    2.0          // These numbers given in Celsius
     #define MAX_TEMP_B    −20.0
/** ADC SENSING ENABLES
***************************************************/
     #define SEND_MEASUREMENTS_ BY_485_ENABLE    YES     // Enables sending
            // parameters by
            // RS485 network
     #define SENSOR_A_TEMPERATURE_ENABLE YES      // Sensor A
     #define SENSOR_B_TEMPERATURE_ENABLE YES      // Sensor B
     #define SENSOR_C_FUNCTIONALITY      TESTMOTORS    // Sensor C
Functionality
            //(SPILLOVER or TESTMOTORS)
     #define _12VOLTS_MONITOR_ENABLE YES     // Sensor D
     #define_24 VOLTS_MONITOR_ENABLE NO     // Internal
Sensing
/** FATAL ERROR HALT RELAYS SELECTION
***************************************************/
(6)  #define RELAY_253_HALT YES        // "YES" or "NO" change on
     fatal error
     #define RELAY_254_HALT YES        // "YES" or "NO" change on
     fatal error
     #define RELAY_255_HALT NO         // "YES" or "NO" change on
fatal error
     #define RELAY_256_HALT NO         // "YES" or "NO" change on
fatal error
/** INPUTS
***************************************************/
     #define SensorA   PORTDbits.RD0
     #define SensorB   PORTDbits.RD1
```

In section (5) of the control specification provided by Table 1(B), a maximum temperature value is specified. This value may in this example represent a minimum among several temperature readings obtain within a refrigerator in sequential order. In this example, four motors are defined to work simultaneously. (first, second, third and last). The first entry ("single") indicates that the motors next defined will operate in sequence.

TABLE 1(C)

```
\Popcorn Machine Diagram\VMC v19.0 - 556 tech\IceCreamProfile.h
/*********************************************************************
****************
FileName:     IceCreamProfile.h
Processor:    PIC18 USB Microcontrollers
Compiler:     Microchip C18
Written For:  556 Tech Ltd.
*********************************************************************
***************/
#ifndef              ICECREAM_PROFILE_H
#defineICECREAM_PROFILE_H
(7)     #defineSINGLE       0
        #defineFIRST    1
        #defineSECOND   2
        #defineTHIRD    3
        #defineLAST     4
        #definefree     0
/** ICE CREAM MACHINE RELAYS NUMBER DEFINITIONS
*************************************************************/
(8)     #defineMIXER        2
        #define CMPSSR   1
        #define FAN      3
/** TIME DEFINES FOR ICE CREAM MACHINE OPERATION
*************************************************************/
(9)     #define MIXER_TEST_TIME    7    // This number given in MINUTES, is the
                                        // time between testings
/** 127VAC POWER SUPPLY RELAY NUMBER AND DELAY DEFINITION
*************************************************************/
(10)    #define SUPLY_127VAC_RELAY     6
        #define_127 VAC_RELAY_DELAY    8    // This number given in Seconds, is the
                                            // delay after a machine cycle starting
/** FLASH MEMORY RESERVED FOR STORING ICE CREAM MODE
*************************************************************/
        #pragma romdata IceCream = 0X1FC00      //100B reserved
        far rom const unsigned int IceCreamProfile [20] [5] = {
```

In section (8) of the control specification provided by Table 1(C), definitions are provided which AC relays will control motors responsible for making the soft serve ice cream. In this example, relay 2 is identified as controlling the mixer (also known as the beater motor). Relay 1 is identified as controlling the heavy compressor, and relay 3 is identified as controlling the condenser fan motor. (see, for example, FIG. 2).

In section (9) of the control specification provided by Table 1(C), the interval of time in which the machine tests ice cream viscosity is determined by activating the motors mentioned identified in section (8) and testing a current draw at relay #2 (the beater motor). A time interval limit may be programmed through a display control board interfacing to a vending machine computer. In the present example, the time interval is set to 7 minutes.

In section (10) of the control specification provided by Table 1(C), a relay for controlling the supply of grid power is identified as relay #6. In addition, a peak cranking demand interval is defined for the beater motor, heavy compressor and fan at 8 seconds. As a result and for example, for an initial 8 seconds these three important motors (beater, compressor, and fan) will draw the power from the inverter. After the initial 8 seconds, relay #6 will turn on thus supplying grid power, at which point a smart relay will automatically switch the power supplied from the battery pack (inverter) power to grid power. In other words, the motors will draw their running amperage from grid power. In contrast to known auxiliary generator application using a smart relay to switch to generator power upon detecting a loss of grid power, switching in this case is conditioned upon the detection of available grid power.

In section (11) of the control specification provided by Table 1(D) below, definitions are provided as to which motors will work simultaneously. An appropriate delay prior to the start of each motor is also specified in order to spread the current demand.

TABLE 1(D)

```
(11)    /** DEFINITIONS OF THE INSTRUCTION SEQUENCE FOR ICE CREAM MODE
        *************************************************************/
/*                              DELAY
/*                              */
/*                              BEFORE      RELAY       TIME
        */
/*              ENABELED        X10Ms       NUMBER      X10mS
/*      INSTRUCTION_1   */      {   YES ,   40      ,   MIXER ,
        1500    ,   FIRST    },
```

TABLE 1(D)-continued

| /* | INSTRUCTION_2 | */ | { | YES | , | 220 | , | CMPSSR | , |
|---|---|---|---|---|---|---|---|---|---|
|  | free | , | SECOND | }, |  |  |  |  |  |
| /* | INSTRUCTION_3 | */ | { | YES | , | 220 | , | FAN | , |
|  | free | , | LAST | {, |  |  |  |  |  |
| /* | INSTRUCTION_4 | */ | { | NO | , | 160 | , | 7 | , |
|  | 300 | , | SINGLE | }, |  |  |  |  |  |
| /* | INSTRUCTION_5 | */ | { | NO | , | 200 | , | 7 | , |
|  | 400 | , | SINGLE | }, |  |  |  |  |  |
| /* | INSTRUCTION_6 | */ | { | NO | , | 240 | , | 1 | , |
|  | 400 | , | SINGLE | }, |  |  |  |  |  |
| /* | INSTRUCTION_7 | */ | { | NO | , | 500 | , | 1 | , |
|  | 600 | , | SINGLE | }, |  |  |  |  |  |
| /* | INSTRUCTION_8 | */ | { | NO | , | 500 | , | 1 | , |
|  | 600 | , | SINGLE | }, |  |  |  |  |  |
| /* | INSTRUCTION_9 | */ | { | NO | , | 500 | , | 1 | , |
|  | 600 | , | SINGLE | }, |  |  |  |  |  |
| /* | INSTRUCTION_10 | */ | { | NO | , | 500 | , | 1 | , |
|  | 600 | , | SINGLE | }, |  |  |  |  |  |
| /* | INSTRUCTION_11 | */ | { | NO | , | 500 | , | 1 | , |
|  | 600 | , | SINGLE | }, |  |  |  |  |  |
| /* | INSTRUCTION_12 | */ | { | NO | , | 500 | , | 1 | , |
|  | 600 | , | SINGLE | }, |  |  |  |  |  |
| /* | INSTRUCTION_13 | */ | { | NO | , | 500 | , | 1 | , |
|  | 600 | , | SINGLE | }, |  |  |  |  |  |
| /* | INSTRUCTION_14 | */ | { | NO | , | 500 | , | 1 | , |
|  | 600 | , | SINGLE | }, |  |  |  |  |  |
| /* | INSTRUCTION_15 | */ | { | NO |  | 500 | , | 1 | , |
|  | 600 | , | SINGLE | }, |  |  |  |  |  |
| /* | INSTRUCTION_16 | */ | { | NO | , | 500 | , | 1 | , |
|  | 600 | , | SINGLE | }, |  |  |  |  |  |
| /* | INSTRUCTION_17 | */ | { | NO | , | 500 | , | 1 | , |
|  | 600 | , | SINGLE | }, |  |  |  |  |  |
| /* | INSTRUCTION_18 | */ | { | NO | , | 500 | , | 1 | , |
|  | 600 | , | SINGLE | }, |  |  |  |  |  |

In the example illustrated in Tables 1(A)-1(D), the battery pack may, for example, be comprised of two deep cycle batteries or one large sealed lead-acid battery bank capable of reserving, for example, 240 amp hours at 12 volts DC. Cranking amperage for the three motors may, for example, be 35 amps at 110 volts, resulting in a combined total current requirement of 450 amps at 12 volts DC. If, for example, the current draw occurs for 8 seconds every 7 minutes on average, this will translate to 9 events per hour. Adding possible vending cycles in between test cycles increase the average to 15 events per hour. As a result, the charge requirement becomes 420×8×15=50,400 amp seconds, 14 amp hours average. An idle conventional inverter draws about 2 amps, making the total average amp hour requirement equal to 16 amp hours. In the specified battery plan, 240 amp hours in reserve/16 amp hours draw=15 hours operating time without charging the batteries in between cycles at optimum. At 50% charge, this will equal 7.5 hours operating time without charging the batteries. The A/C controller is programmed for continuous battery charging in between draw cycles.

Tables 2(A)-2(D) illustrate programmable control instructions that are provided to the A/C controller of the auxiliary A/C power supply system of FIG. 1 for use with the exemplary microwave popcorn machine ("cooker mode").

In section (1) of the control specification provided by Table 2(A), the mode for the phantom relay 248 is set to "cooker." In section (2), relay 7 is identified for activating the charging mechanism of the Battery Bank. Relay 7 will be instructed to turn to OFF position once Relay 248 is called for, in order to prevent charging when a load is placed on the battery and inverter.

TABLE 2(A)

```
\Popcorn Machine Diagram\VMC v19.0 - 556 tech cooker/HardwareProfi
/************************************************************************
FileName:      HardwareProfile.h
Processor:     PIC18 USB Microcontrollers
Compiler:      Microchip C18
Written For:   556 Tech Ltd.
*************************************************************************/
#ifndef HARDWARE_PROFILE_H
#define HARDWARE_PROFILE_H
/** D E F I N I T I O N S
*******************************************************/
#defineYES 1
#defineNO 0
#defineSPILLOVER 1
#defineTESTMOTORS 0
#defineFREEZER 1
#defineCOOKER 2
#defineCLOCK_FREQ 48000000
#defineGetSystemClock( ) CLOCK_FREQ
/** PREDEFINED MAX TIME FOR TEST ALL MOTORS
***************************************\
#defineTIME_FOR_TEST_MACHINE 60 //<== Adjust this number in seconds multiple
/** DEFINITION OF THE FUNCTIONALITY OF RELAY 248 COMMAND
***********************/
(1)  #define RELAY_248_FUNCTIONALITY COOKER      //Selects machine profile
          //FREEZER or COOKER
(2)  #define BATTERY_RELAY 7
/** DEFINITION OF THE DELAY FOR CHARGE BATTERY AFTER A MACHINE CYCLE
***********/
(3)  #define DELAY_4BATT_CHARGE_AFTER_CYCLE      30  //This number given
in seconds
```

In section (3) of the control specification provided by Table 2(A), the delay in which time the Relay Sensor mechanism senses the current applied needs to be calculated to achieve a stable battery bank voltage at 30 seconds.

In section (4) of the control specification provided by Table 2(B) below, the A/C controller is instructed to measure the battery bank voltage on a continuing basis, to deactivate Relay #5 if battery voltage exceeds 14.5 volts and re-activate Relay #5 when battery voltage is less than 12.3 volts. Once again, these values will vary according to the characteristics and specifications of the battery bank.

TABLE 2(B)

```
\Popcorn Machine Diagram\VMC v19.0 - 556 tech cooker/HardwareProfi
         // between 6 and 150
/** BATTERY MAXIMUM AND MINIMUM VOLTAGES DEFINITON
*********************************/
(4)     #defineMAXIMUM_BATT_VOLTAGE           14.5
#defineMINIMUM_BATT_VOLTAGE       12.3
/** TEMPERATURE MAXIMUM VALUE DEFINITION
***************************************************/
(5)     #defineMAX_TEMP_A           130 //These numbers given in Celsius
#definMAX_TEMP_B    45
/** ADC SENSING ENABLES
************************************************************/
#define SEND_MEASUREMENTS_BY_485_ENABLE     YES      //Enable sending
//parameters by
//RS48 network
#define SENSOR_A_TEMPERATURE_ENABLE YES     //Sensor A
#define SENSOR_B_TEMPERATURE_ENABLE YES     //Sensor B
#define SENSOR_C_FUNCTIONALITY   TESTMOTORS           //Sensor C Functionality
          //(SPILLOVER or TESTMOTORS)
#define _12VOLTS_MONITOR_ENABLE YES     //Sensor D
#define _24VOLTS_MONITOR_ENABLE NO      //Internal Sensing
/** FATAL ERROR HALT RELAYS SELECTION
***********************************************/
(6)     #define RELAY_253_HALT
fatal error    YES     //"YES" or "NO" change on
#define RELAY_254_HALT
fatal error    YES     //"YES" or "NO" change on
#define RELAY_255_HALT
fatal error    NO      //"YES" or "NO" change on
```

TABLE 2(B)-continued

```
#define RELAY_256_HALT
fatal error    NO      //"YES" or "NO" change on
/** I N P U T S
********************************************************************
***********/
#define SensorA        PORTDbits.RD0
#define SensorB        PORTDbits.RD1
```

In section (5) of the control specification provided by Table 2(B), a maximum temperature value is specified. In this example, if a temperature measured outside the microwave cooking area exceeds 130 degrees Celsius, an error message will be generated and activate the emergency relays to cut the 24 volt supply to the AC relay system, thereby shutting down the microwave components of the vending machine. As another example, a second maximum temperature value is set to protect the machine itself. In this case, if an ambient temperature of the machine exceeds 45 degrees Celsius, an error massage will be generated and activate a control sequence for shutting down the machine.

In section (6) of the control specification provided by Table 2(B), relays 253 through 256 are identified as emergency relays. In section (7) of the control specification provided by Table 2(C) below, definitions are provided for motors working simultaneously and motors working sequentially (these definitions help in preparing a load profile for the machine). As illustrated in section (7): a) relay 1 is assigned to magnetron 1 (which will get its energy from the grid power), b) relay 2 is assigned to the cooling fan motors for the magnetrons, c) relay 3 is assigned to magnetron 2 (which will get its energy from the battery pack), d) relay 5 is assigned to the two microwave antennas (top and bottom), and e) relay 7 is assigned to the battery charger.

TABLE 2(C)

```
\Popcorn Machine Diagram\VMC v19.0 - 556 tech cooker/HardwareProfi
/******************************************************************
FileName:      CookingProfile.h
Processor:     PIC18 USB Microcontrollers
Compiler:      Microchip C18
Written For:   556 Tech Ltd.
*******************************************************************/
#ifndef COOKING_PROFILE_H
#define COOKING_PROFILE_H
        (7)     #define SINGLE       0
#define FIRST    1
#define SECOND   2
#define THIRD    3
#define LAST     4
/** DEFINTIONS OF THE LIMITS OF THE VOLTAGE BATTERY
******************************/
        (8)     #define HIGH_VOLTAGE    12.5
#define LOW_VOLTAGE     11.3
/** DEFINITIONS OF THE LIMITS OF THE TEMPERATURE
******************************/
        (9)     #define HIGH_TEMPERATURE    25
#define LOW_TEMPERATURE     15
/** FLASH MEMORY RESERVED FOR STORING COOKING MODES
******************************/
#pragma romdata CookingProfiles =      0X1D400        //2KB reserved far rom const unsigned int
CookProfile [9][20][5] ={
/**DEFINITIONS OF THE INSTRUCTION SEQUENCE FOR COOK MODE 1
********************/
{
(10)    /*                                DELAY
        /*                                BEFORE      RELAY             TIME
                /*
        /*      /*      ENABLED           X10mS                NUMBER   X10mS
        INDEX   /*
/*      INSTRUCTION_1.1 */                {  YES ,   40    ,   1    ,   5000
,       FIRST   },
/*      INSTRUCTION_1.2 */                {  YES ,   20    ,   2    ,   5000
,       SECOND  },
/*      INSTRUCTION_1.3 */                {  YES ,   120   ,   3    ,   5000
,       THIRD   },
/*      INSTRUCTION_1.4 */                {  YES ,   100   ,   5    ,   5000
,       LAST    },
/*      INSTRUCTION_1.5 */                {  NO  ,   0     ,   1    ,   300
,       SINGLE  },
/*      INSTRUCTION_1.6 */                {  NO  ,   500   ,   1    ,   600
```

There are three possible microwave cooking modes based on the battery bank voltage. As illustrated in section (8) of the control specification provided by Table 2(C), high voltage and low voltage inputs will determine the length of each cooking cycle, as well as the length of time magnetron 2 will be powered by the battery pack and inverter. In the illustrated example, if the battery bank measures 12.5 volts or higher, this will trigger an optimum cooking mode where magnetron 2 (which is powered by the battery pack) works the same amount of time as magnetron 1 (which is powered by grid power); thereby cooking the popcorn at a maximum speed. If the battery bank voltage measures less than 12.5 volts but more than 11.3 Volts, a second cooking mode is activated; where magnetron 2 will work 40% less (thus utilizing the battery pack 40% less) and magnetron 1 will make up for that time, thus increasing the cooking cycle time. This cooking mode will be maintained until the battery bank gets charged and voltage surpasses the 12.5 volts. If battery bank voltage measures less than the 11.3 volts, a third cooking mode will be selected in which the battery pack will not be used and the popcorn will cook with just magnetron 1 at a lengthier cooking time.

As illustrated in section (9) of the control specification provided by Table 2(C), ambient temperature can affect the length of time it is necessary to cook the popcorn. In the illustrated example, a range of 25 degrees Celsius and higher will apply cooking mode 1, which is the quickest. Between 25 and 15 degrees Celsius, the second cooking mode and below 15 degrees Celsius the third cooking mode is applied.

As illustrated in section (10) of the control specification, which begins in Table 2(C) and continues in Table 2(D) below, nine cooking mode possibilities taking into account battery bank voltage and ambient temperatures. A third variable may be added in some locations where the Barometric pressure will be measured and calculated and will affect the cooking cycle as well.

TABLE 2(D)

```
,               SINGLE },
/*              INSTRUCTION_1.7 */      { NO ,   500 ,   1 ,    600
,               SINGLE },
/*              INSTRUCTION_1.8 */      { NO ,   500 ,   1 ,    600
,               SINGLE },
/*              INSTRUCTION_1.9 */      { NO ,   500 ,   1 ,    600
,               SINGLE },
/*              INSTRUCTION_1.10 */     { NO ,   500 ,   1 ,    600
,               SINGLE }
},
/**             DEFINITIONS OF THE INSTRUCTION SEQUENCE FOR COOK MODE 2
                ***********************/
{
/*                                      DELAY
                                */
/*                              BEFORE  RELAY                   TIME
                /*
                /*      /*      ENABLED X10mS            NUMBER  X10mS
INDEX                   */
/*              INSTRUCTION_2.1 */      { YES ,  40  ,   1 ,    5000
,               FIRST           },
/*              INSTRUCTION_2.2 */      { YES ,  20  ,   2 ,    5000
,               SECOND          },
/*              INSTRUCTION_2.3 */      { YES ,  120 ,   3 ,    5000
,               THIRD           },
/*              INSTRUCTION_2.4 */      { YES ,  100 ,   5 ,    5000
,               LAST            },
/*              INSTRUCTION_2.5 */      { NO ,   500 ,   1 ,    600
,               SINGLE          },
/*              INSTRUCTION_2.6 */      { NO ,   500 ,   1 ,    600
,               SINGLE          },
/*              INSTRUCTION_2.7 */      { NO ,   500 ,   1 ,    600
,               SINGLE          },
/*              INSTRUCTION_2.8 */      { NO ,   500 ,   1 ,    600
,               SINGLE          },
/*              INSTRUCTION_2.9 */      { NO ,   500 ,   1 ,    600
,               SINGLE          },
/*              INSTRUCTION_2.10 */     { NO ,   500 ,   1 ,    600
,               SINGLE          }
},
/**             DEFINITIONS OF THE INSTRUCTION SEQUENCE FOR COOK MODE 3
                ***********************/
{
/*                                      DELAY
                                */
/*                              BEFORE  RELAY                   TIME
                /*
                /*      /*      ENABLED X10mS            NUMBER  X10mS
INDEX                   */
\Popcorn Machine Diagram\VMC v19.0 - 556 tech cooker/CookingProfi
/*              INSTRUCTION_3.1 */      { YES ,  40  ,   1 ,    5000
,               FIRST           },
/*              INSTRUCTION_3.2 */      { YES ,  20  ,   2 ,    5000
,               SECOND          },
/*              INSTRUCTION_3.3 */      { YES ,  120 ,   3 ,    5000
,               THIRD           },
/*              INSTRUCTION_3.4 */      { YES ,  100 ,   5 ,    5000
,               LAST            },
```

TABLE 2(D)-continued

| INDEX | | ENABLED | DELAY BEFORE RELAY X10mS | RELAY NUMBER | TIME X10mS |
|---|---|---|---|---|---|
| /* INSTRUCTION_3.5 */, FIRST }, | | { NO, | 500, | 1, | 600 |
| /* INSTRUCTION_3.6 */, SECOND }, | | { NO, | 500, | 1, | 600 |
| /* INSTRUCTION_3.7 */, THIRD }, | | { NO, | 500, | 1, | 600 |
| /* INSTRUCTION_3.8 */, LAST }, | | { NO, | 500, | 1, | 600 |
| /* INSTRUCTION_3.9 */, SINGLE }, | | { NO, | 500, | 1, | 600 |
| /* INSTRUCTION_3.10 */, SINGLE } | | { NO, | 500, | 1, | 600 |

},
/** DEFINITIONS OF THE INSTRUCTION SEQUENCE FOR COOK MODE 4
**********************/
{

| INDEX | | ENABLED | DELAY BEFORE RELAY X10mS | RELAY NUMBER | TIME X10mS |
|---|---|---|---|---|---|
| /* INSTRUCTION_4.1 */, FIRST }, | | { YES, | 40, | 1, | 8000 |
| /* INSTRUCTION_4.2 */, SECOND }, | | { YES, | 20, | 2, | 8000 |
| /* INSTRUCTION_4.3 */, SECOND }, | | { YES, | 120, | 3, | 3000 |
| /* INSTRUCTION_7.7 */, SINGLE }, | | { NO, | 500, | 1, | 600 |
| /* INSTRUCTION_7.8 */, SINGLE }, | | { NO, | 500, | 1, | 600 |
| /* INSTRUCTION_7.9 */, SINGLE }, | | { NO, | 500, | 1, | 600 |
| /* INSTRUCTION_7.10 */, SINGLE } | | { NO, | 500, | 1, | 600 |

},
/** DEFINITIONS OF THE INSTRUCTION SEQUENCE FOR COOK MODE 8
**********************/
{

| INDEX | | ENABLED | DELAY BEFORE RELAY X10mS | RELAY NUMBER | TIME X10mS |
|---|---|---|---|---|---|
| /* INSTRUCTION_8.1 */, FIRST }, | | { YES, | 40, | 1, | 12000 |
| /* INSTRUCTION_8.2 */, SECOND }, | | { YES, | 20, | 2, | 12000 |
| /* INSTRUCTION_8.3 */, SINGLE }, | | { NO, | 120, | 3, | 20 |
| /* INSTRUCTION_8.4 */, LAST }, | | { YES, | 100, | 5, | 12000 |
| /* INSTRUCTION_8.5 */, SINGLE }, | | { NO, | 500, | 1, | 600 |
| /* INSTRUCTION_8.6 */, SINGLE }, | | { NO, | 500, | 1, | 600 |
| /* INSTRUCTION_8.7 */, SINGLE }, | | { NO, | 500, | 1, | 600 |
| /* INSTRUCTION_8.8 */, SINGLE }, | | { NO, | 500, | 1, | 600 |
| /* INSTRUCTION_8.9 */, SINGLE }, | | { NO, | 500, | 1, | 600 |
| /* INSTRUCTION_8.10 */, SINGLE } | | { NO, | 500, | 1, | 600 |

},
/** DEFINITIONS OF THE INSTRUCTION SEQUENCE FOR COOK MODE 9
**********************/
{

| INDEX | | ENABLED | DELAY BEFORE RELAY X10mS | RELAY NUMBER | TIME X10mS |
|---|---|---|---|---|---|
| /* INSTRUCTION_9.1 */, FIRST }, | | { YES, | 40, | 1, | 12000 |
| /* INSTRUCTION_9.2 */, SECOND }, | | { YES, | 20, | 2, | 12000 |

TABLE 2(D)-continued

```
/*      INSTRUCTION_9.3 */    {  NO ,   120  ,  3  ,  20    } ,
        SINGLE        },
/*      INSTRUCTION_9.4 */    {  YES ,  100  ,  5  ,  12000 } ,
        LAST          },
/*      INSTRUCTION_9.5 */    {  NO ,   500  ,  1  ,  600   } ,
        SINGLE        },
/*      INSTRUCTION_9.6 */    {  NO ,   500  ,  1  ,  600   } ,
        SINGLE        },
/*      INSTRUCTION_9.7 */    {  NO ,   500  ,  1  ,  600   } ,
        SINGLE        },
/*      INSTRUCTION_9.8 */    {  NO ,   500  ,  1  ,  600   } ,
        SINGLE        },
/*      INSTRUCTION_9.9 */    {  NO ,   500  ,  1  ,  600   } ,
        SINGLE        },
/*      INSTRUCTION_9.10 */   {  NO ,   500  ,  1  ,  600   }
        SINGLE        }
  }
};
```

/** LOGIC OF SELECTION COOK MODE
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

#########################################################################################
#######
##########################

```
              Higher than
HIGH_TEMPERATURE =============== Cook Mode 1
              /
              HIGH_TEMPERATURE
--------------------------------------------------------------------------------------------------------------
              /     \
          Higher than HIGH VOLTAGE              Higher than
LOW_TEMPERATURE but Lower
            /     \           / or equal than
HIGH_TEMPERATURE === Cook Mode 2
              /             LOW_TEMPERATURE
--------------------------------------------------------------------------------------------------------------
              /     \
              /  Lower or equal than
          LOW_TEMPERATURE = Cook Mode 3
              /
              HIGH_VOLTAGE
oooooooooooooooooooooooooooooooooooooooooooooooooooooooooooooooooooooooooooooooooooooooooooooooooo
ooooooooooooooooooooooooooo
ooooooooooooooooooooooooooo
              \
              \         Higher than
HIGH_TEMPERATURE ======================= Cook Mode 4
              \
              \          HIGH_TEMPERATURE
--------------------------------------------------------------------------------------------------------------
              \     /     \
          Lower than HIGH VOLTAGE              Higher than
LOW_TEMPERATURE but Lower
              But Higher than LOW_VOLTAGE or equal than
HIGH_TEMPERATURE =================== Cook Mode 5
              /     \     /
              /          LOW_TEMPERATURE
--------------------------------------------------------------------------------------------------------------
LOW_ VOLTAGE
oooooooooooooooooooooooooooooooooooooooooooooooooooooooooooooooooooooooooooooooooooooooooooooooooo
ooooooooooooooooooooooooooo
ooooooooooooooooooooooooooo
              \     /     \
              /  Lower or equal than
LOW_TEMPERATURE = Cook Mode 6
              /
--------------------------------------------------------------------------------------------------------------
              \
              \         Higher than
LOW_TEMPERATURE =================== Cook Mode 7
              \     /
              \          HIGH_TEMPERATURE
--------------------------------------------------------------------------------------------------------------
```

TABLE 2(D)-continued

```
----
        \       /      \
         Lower or equal than LOW_VOLTAGE        Higher than
LOW_TEMPERATURE but Lower
         \       / or equal than
HIGH_TEMPERATURE ===== Cook Mode 8
         \          LOW_TEMPERATURE
--------------------------------------------------------------------------------
----
        \
         Lower or equal than
LOWER_TEMPERATURE = Cook Mode 9
################################################################################
#############
##############################
*/
/*************************************************************************
**************
*************/
#endif
```

In the example illustrated by Tables 2(D), the battery pack may, for example, be comprised of four deep cycle batteries or a sealed lead acid battery bank capable of reserving 480 amp hours at 12 volts DC. Magnetron 2 will be powered by the battery pack and inverter, and draws 15-16 amps at 110 volts which will translate to (15×12)=180 amps at 12 volts DC. With an average draw from the power pack of 50 seconds and estimated average of 15 events per hour, the charge requirements amount to 180×50×15=135,000 amp seconds, or 37.5 amp hours. An idle Inverter idle draws about 2 amps, therefore the total average amp hour requirement is (37.5+2)=39.5 amp hours.

In the specified battery pack plan, 480 amp hours in reserve/39.5 amp hours drawn=12 Hours operating time without charging the batteries in between cycles at optimum. At 50% charge, this will equal 6 hours operating time without charging the Batteries. In our application batteries get charged quickly in between cycles.

Figure 4A:
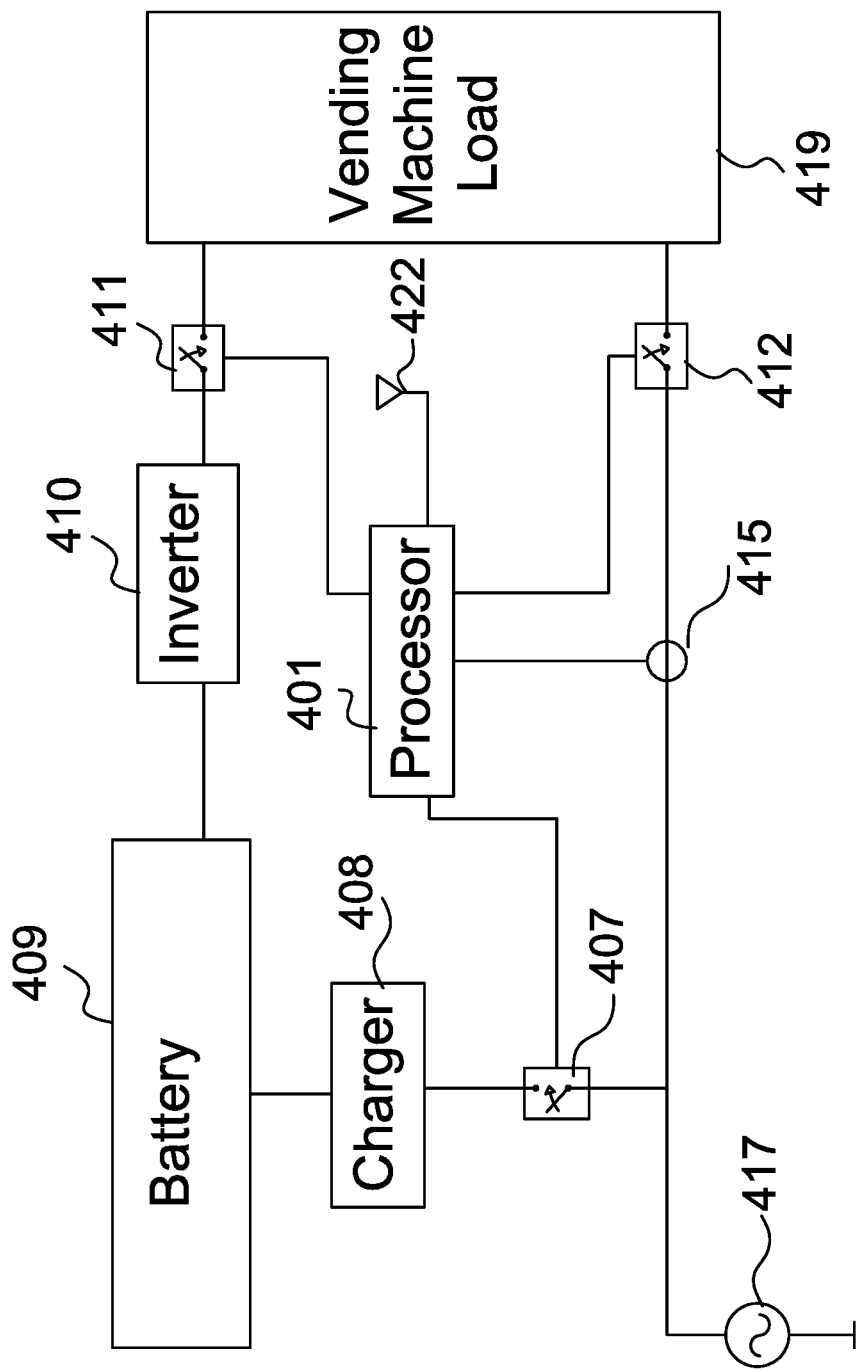
FIG. 4A is a schematic diagram illustrating elements of an exemplary auxiliary A/C power supply system according to aspects of the present invention.

FIG. 4A provides a high-level schematic diagram of a base auxiliary A/C power supply system in accordance with aspects of this disclosure. Standard 110 volt A/C grid power is provided at an input outlet 417 for providing power to one input load of a vending machine 419 and to a charger 408 for charging a battery plant 409. A processor 401 selectively controls the supply of grid power to the charger 408 via a battery charge control relay 407, and selectively controls the supply of grid power to the vending machine load via an AC power gate relay 412. The battery 409 provides auxiliary power to an inverter 410 for delivery to a second input load of the vending machine. The processor 401 controls the supply of auxiliary power to the second input load via a battery power gate relay 411. A current sensor 415 (for example, a Hall effect sensor) communicates information about grid power current draw to the processor 401. In addition, processor 401 is preferably coupled to a wireless transmitter/receiver 422 (for example, such as a cellular transmitter/receiver or WIFI transmitter/receiver) for remote communications. Such remote communications could for example, be used to receive remote instructions, report trouble conditions and/or provide historical data collected according to regulatory agency requirements. Although depicted separately, charger 408 and inverter 410 may alternatively be implemented in a combined component.

Figure 4B:
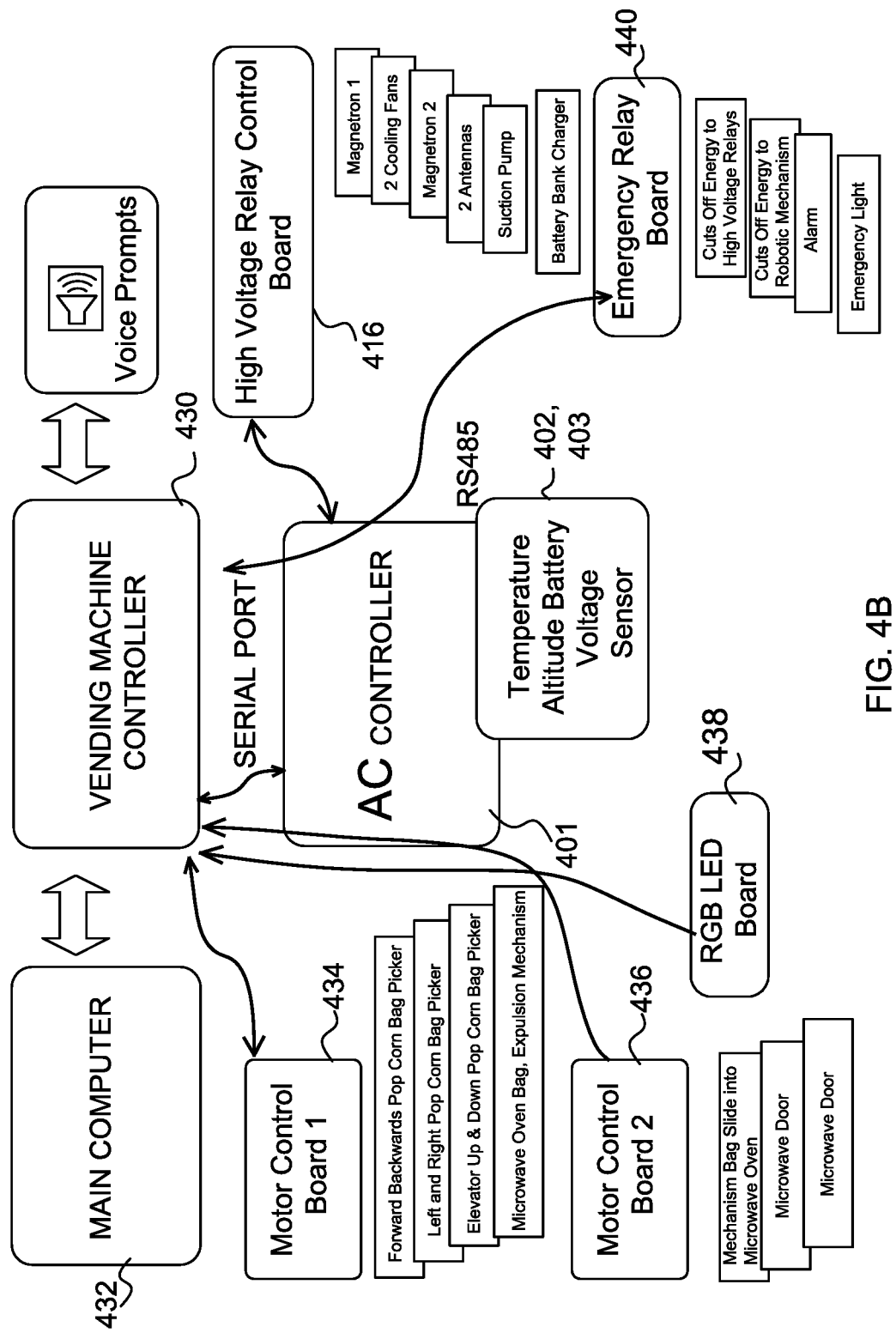
FIG. 4B is a schematic diagram further illustrating elements of an auxiliary A/C power supply system according to aspects of the present invention.

FIG. 4B illustrates the auxiliary A/C power supply system in combination with related control elements of an associated vending machine. The A/C controller 401 communicates with a vending machine controller (VMC) 430, which interfaces with a main computer 432 having a touch screen interface for communicating with a vending machine customer and/or with maintenance personnel. The VMC 430 controls vending machine operations, for example, by means of motor board controls 434, 436 and emergency relay board 440. The VMC 430 may in addition control visual display aspects of the vending machine by means of an RGB LED board 438. As illustrated in FIG. 6B, the A/C controller 401 communicates with temperature, altitude and battery voltage sensors 402, 403 which provide outputs that impact the selected power supply modes discussed earlier in conjunction with Tables 1(A)-1(D), 2(A)-2(D).

Figure 5A:
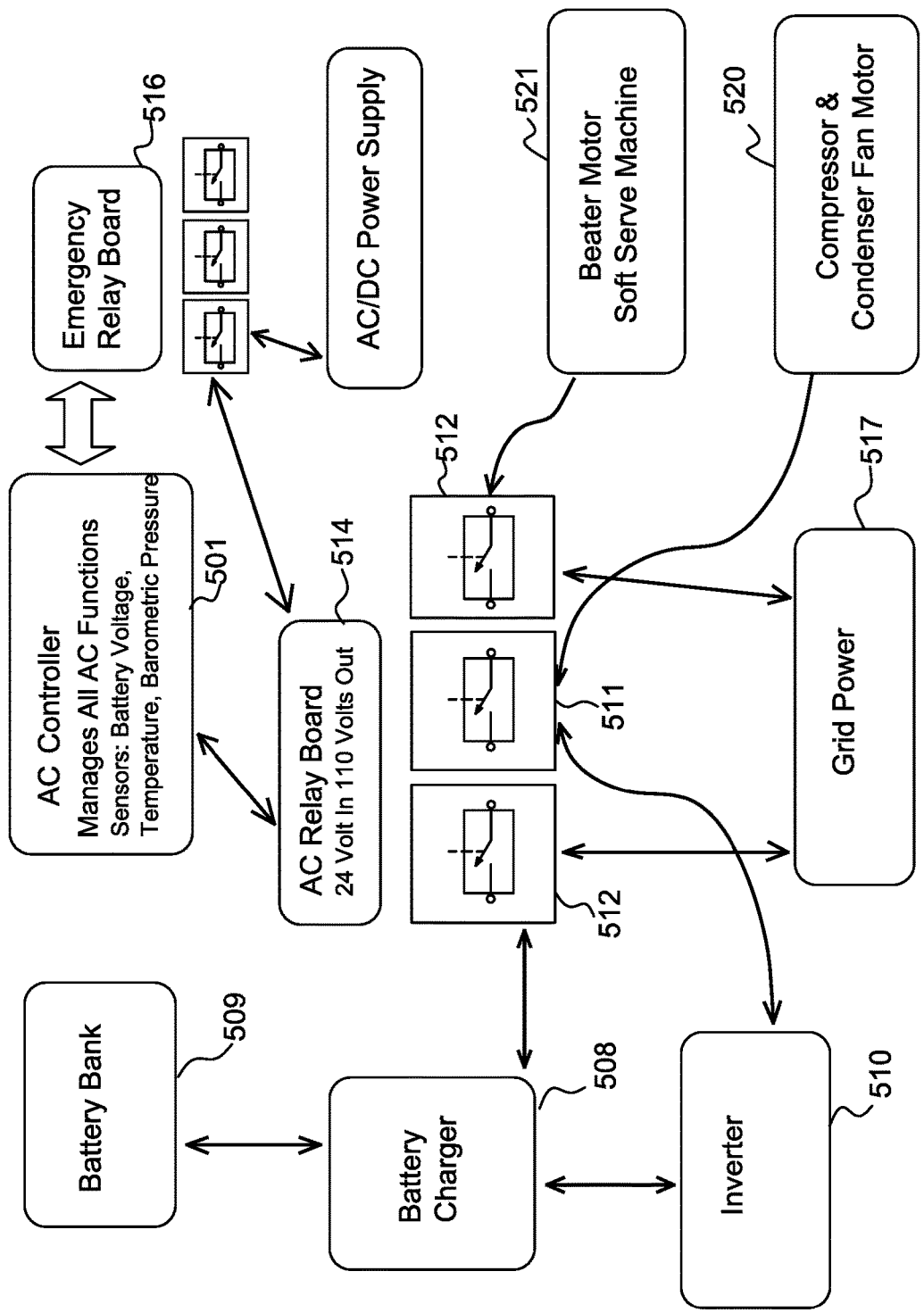
FIG. 5A is a schematic diagram illustrating an application of an auxiliary A/C power supply system according to aspects of the present invention to the exemplary ice cream vending machine.

FIG. 5A illustrates the auxiliary A/C power supply system in combination with elements of an exemplary high-powered soft serve ice cream vending machine. In this case, the A/C power gate relay 512 is used to control the supply of grid power to beater motor 521 of the ice cream machine, and battery power gate relay 511 is used to control the supply of auxiliary power to the compressor and condenser fan motors of the ice cream machine. The relays 511, 512 are controlled by A/C controller 501 and A/C relay board 514. In an emergency, emergency relay board 516 may be controlled by A/C controller 501 to cut off 24 volt DC power to the A/C relay board 501, thereby maintaining the relays 511, 512 in a default state that halts operation of the A/C power supply system.

Figure 5B:
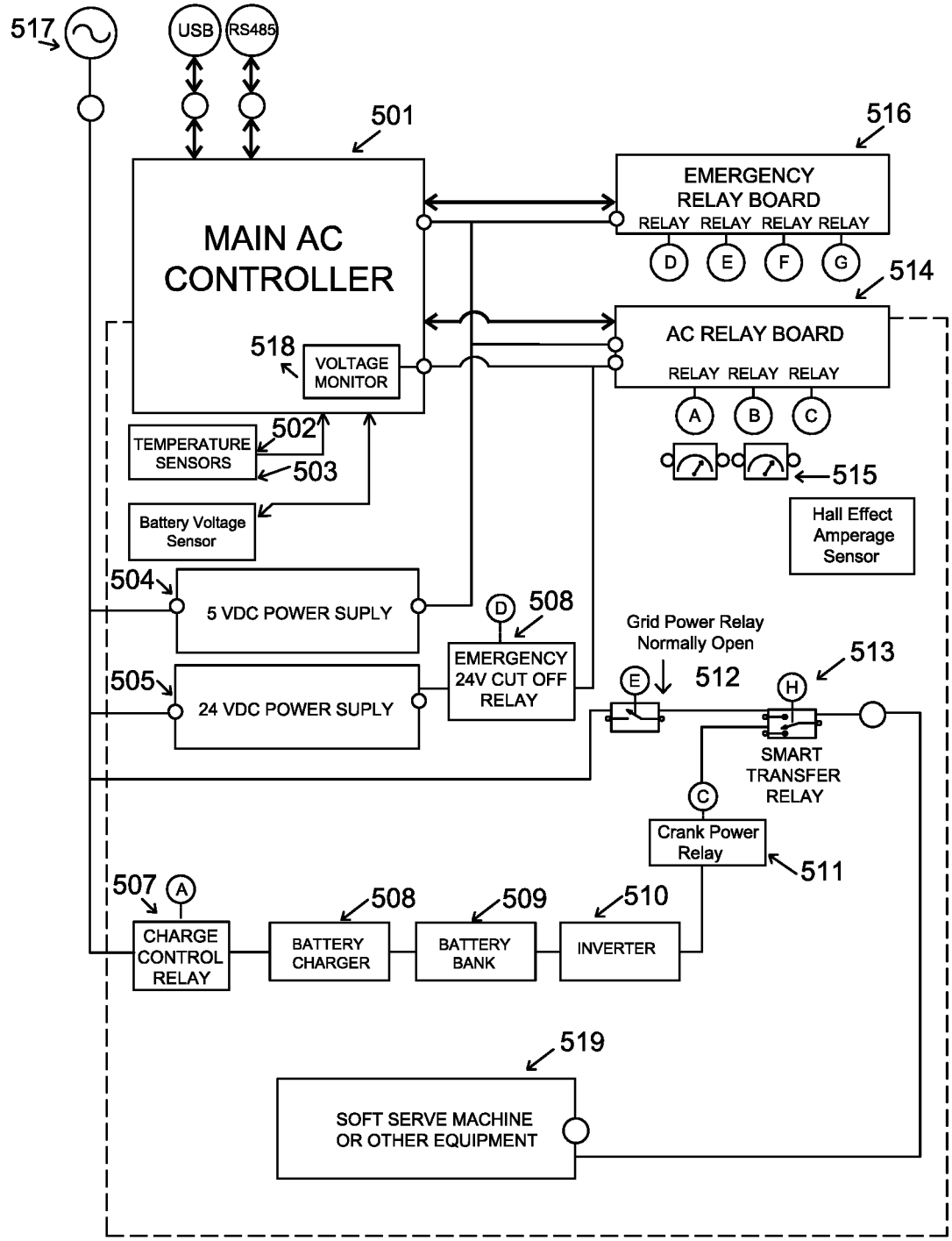
FIG. 5B is a schematic diagram illustrating an alternate application of an auxiliary A/C power supply system according to aspects of the present invention to the exemplary ice cream vending machine.

FIG. 5B illustrates an alternate configuration of the auxiliary A/C power supply system in combination with elements of a high powered soft serve ice cream vending machine 519. By way of example, the machine 519 may have a current draw at 110 V of 35 amps, and a running amperage draw of 15-16 amps. An ordinary outlet 517 available in any vending location provides 110 volts A/C with a breaker rated at 15-16 amps.

The A/C controller 501 controls decisions through pre-programmed look up tables stored in memory (not shown) and created, for example, from the control instructions illustrated in FIG. 4. In this embodiment, the AC Controller will decide on the duration of auxiliary power demanded by the ice cream machine based on an initial one time Cranking or start up power up demand. As earlier noted, the A/C controller may use signals provide by ambient temperature sensor 502 and/or battery bank voltage sensor 503 to adjust the power cycle.

For example, the higher the ambient temperature is, the softer the ice cream will become in the freezing cylinders and the auger or beater motor will need less crank up power. The opposite will be true when ambient temperature is cold. In the case, for example, that the viscosity level in the ice cream machine is set to a higher limit due to the warmer weather and the ice cream machine is set up to completely overcome the higher ambient temperature, the compressor will be set to more frequent starts. In this case, the A/C controller will manage the auxiliary power duration based on battery bank voltage and the frequency of the starts, since the crank demand of the augers will also be high.

As shown in FIG. 5B, emergency relay board 516 is also powered by 5 volt DC power supply 704 and the AC relay board 514 is powered by 24 volt DC power supply 505. In case of an emergency (for example, low voltage in the battery bank 509, charger 508 malfunction, current demand exceeding an equipment limit, and so on) an emergency relay 506 which is normally open will close and stop the 24 Volt power supply 505 from supplying power to AC relay board 514. This protective measure will eliminate many of the causes of wall fires, or breakers jumping at the main panel, when equipment malfunctions.

Battery charge control relay 507 is in charge of activating and deactivating the battery charger 508. At any given time when AC controller 501 senses a current demand (for example, as indicated by Hall effect sensor 515 located at the AC relay board 514, it will open battery charge control relay 507 first, stopping the battery charger 508, and then battery power gate relay 511 giving cranking power through the inverter 510. A/C controller 501 will determine the cranking duration necessary for the vending machine 519 (for example, from the look-up tables), and then close A/C power gate relay allowing grid power to come after the cranking duration is over and the auxiliary power has been removed. By means of a smart transfer relay, power can be relatively seamlessly and smoothly switched between auxiliary power and grid power. One suitable switch for use as the smart switch 513 is the POWERMAX PMTS-50 50A Automatic Transfer Switch available from PowerMax of Bradenton, Fla.

Figure 6:
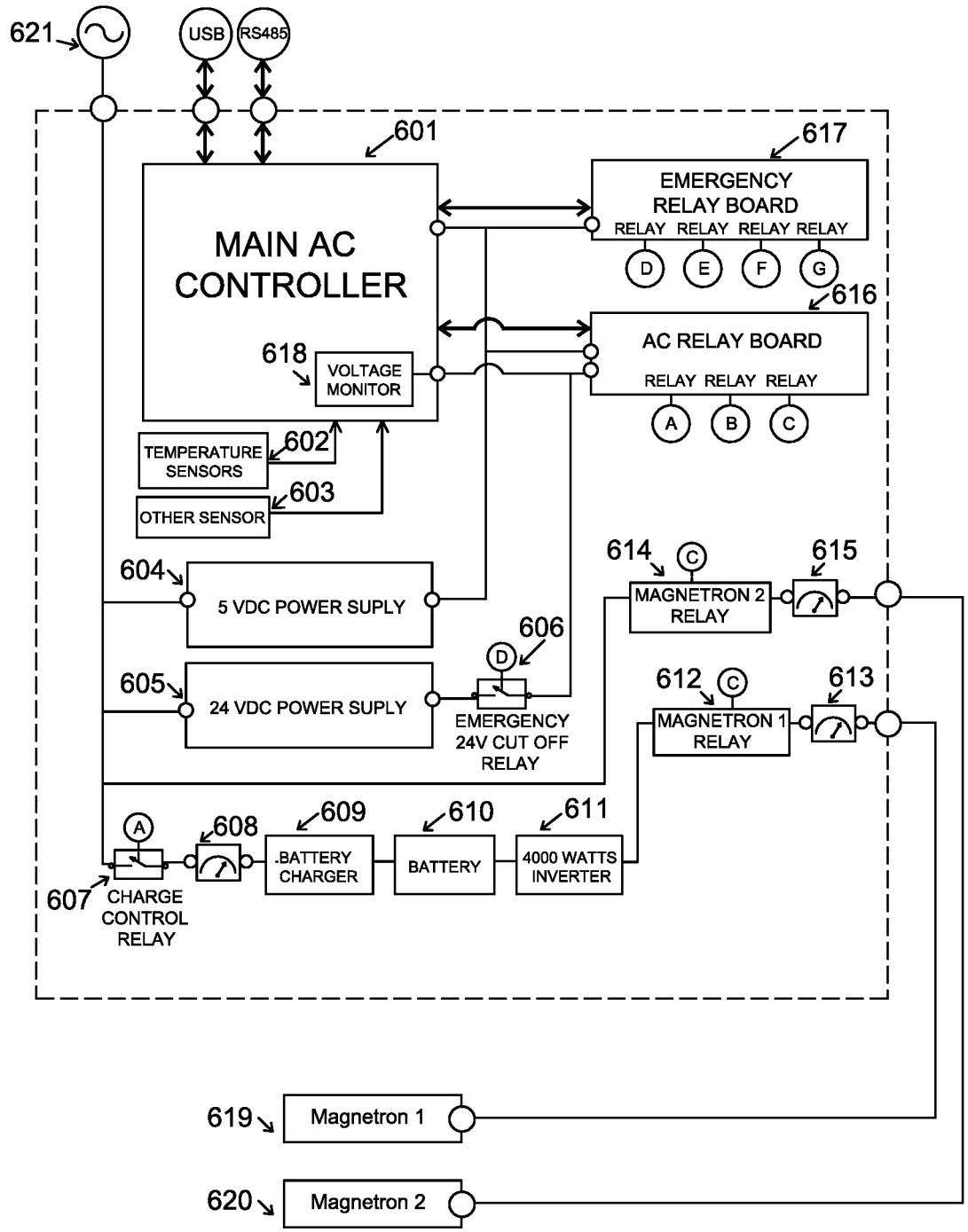
FIG. 6 is a schematic diagram illustrating an application of an exemplary auxiliary A/C power supply system according to aspects of the present invention to the exemplary popcorn vending machine.

FIG. 6 illustrates the auxiliary A/C power supply system in combination with elements of a high powered microwave popcorn vending machine. The vending machine includes a commercial microwave oven having two magnetrons; each rated at 15-16 amps.

As illustrated in FIG. 6, magnetron 619 is powered through battery power gate relay 612, and is energized by an inverter 611 which is connected to a battery bank 610. The inverter 611, for example, may be an AIMS Pure Sine 4,000 Watt inverter available from AIMS POWER of Reno Nev., which also incorporates the battery charger 809. A Hall effect current sensor 613 is used to determine a current draw of the magnetron 619 of the associated microwave oven. The AC controller 601 analyzes the current draw data, and compares this to a look up table for verification prior to the sending the command to the battery power gate relay 612 to close. This provides an additional safety mechanism in the event that magnetron 619 is malfunctioning.

Magnetron 620 of the microwave oven is powered through AC power gate relay 614 straight from grid power outlet 621. As illustrated by way of example in FIG. 6, the A/C controller 601 and relay boards 616, 617 are powered by 5 volt DC power supply 604. AC relays A, B and C located on AC relay board 616 are energized by 24 volt DC power supply 605. Emergency Relay D 606 may be instructed by A/C controller 601 to interrupt the 24 volt DC power from reaching the AC relays on board 616 in case of an emergency event identified by the AC Controller 601. One possible emergency event could be a low voltage condition in battery bank 610 as determined by voltage monitor 618 based on a signal provided by voltage sensor 603. Other emergency events could be a loss of grid power as measured by current sensor 615, receipt of a current request by one of the magnetrons 619, 620 that exceed a predetermined maximum value, and so on.

Battery charge control sensor 607 controls the charging of the battery bank 610 by high speed charger 609. Upon activation of magnetron 619, AC controller 601 opens battery charge control relay 607 to discontinue. This step will reduce load on the Grid Panel, as well as protect the battery charger 609 from damage during the operation of inverter 611.

Figure 7:
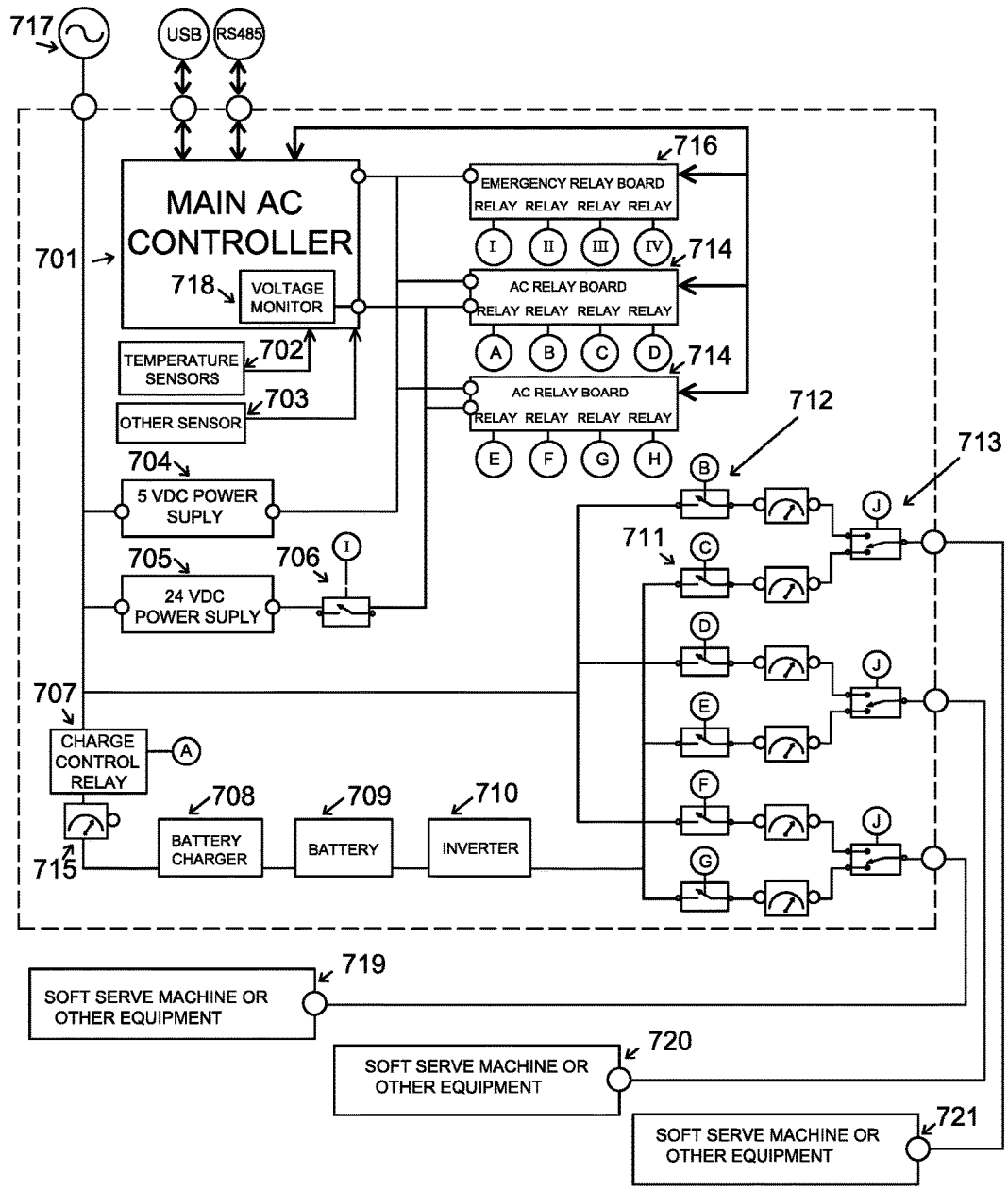
FIG. 7 is a schematic diagram illustrating an application of an exemplary auxiliary A/C power supply system according to aspects of the present invention to multiple machines.

FIG. 7 illustrates the auxiliary A/C power supply system in an exemplary configuration for providing auxiliary power to multiple high power vending machines. As illustrated in FIG. 7, each of the grid power outputs and battery power outputs of the auxiliary A/C power supply system is respectively connected via A/C power gate relays 712 and battery power gate relays 711 to each of three high power machines 719, 720 and 721. A/C power gate relays 712 and battery power gate relays 711 are pairwise connected to respective smart transfer relays 713. A/C controller 701 controls the A/C power gate relays 712 and battery power gate relays 711 via respective A/C relay boards 714.

Grid A/C power outlet 717 is configured with a current capacity sufficient to meet the steady-state current draw required by the high power machines 719, 720 and 721. This capacity may be provided through a single outlet having adequate current capacity, or by multiple outlets each providing 110 volt, 15-16 amp service to a respective one of the high power machines 719, 720 and 721.

Operation of the system according to FIG. 7 is quite similar to operation of the system depicted in FIG. 5B. Battery charge control relay 707 is in charge of activating and deactivating the battery charger 708. At any given time when AC controller 701 senses a current demand (for example, as indicated by current sensor monitoring one of grid or battery current demand), or alternatively receives an external signal indicative of such demand, AC controller 701 will act to open battery charge control relay 707 first, stopping the battery charger 708, and then close a battery power gate relay 711 associated with the one of machines 719, 720 and 721 that is demanding current to provide cranking power through the inverter 710. A/C controller will determine the cranking duration necessary for the one machine 719, 720 or 721 (for example, from the look-up tables), and then close A/C power gate relay allowing grid power to come after the cranking duration is over and the auxiliary battery power has been removed. By means of a smart transfer relay 713, power can be seamlessly and smoothly switched between auxiliary power and grid power. One suitable switch for use as the smart switch 713 is the POWERMAX PMTS-50 50A Automatic Transfer Switch available from PowerMax of Bradenton, Fla. In this manner, associated costs of the auxiliary system can be reduced over configurations placing an auxiliary A/C power supply system with each high power machine A/C controller 701 controls the A/C power gate relays 712 and battery power gate relays 711 via respective A/C relay boards 714.

Reference Character Table

The following table lists the reference characters and names of features and elements used herein:

| Ref. char. | Feature or element |
|---|---|
| 1 | Power drawer |
| 2 | Inverter/charger |
| 3 | Deep cycle battery bank |
| 4 | Lower base protrusion |
| 5 | Lower base |
| 6 | Support beam |
| 7 | Upper structure |
| 8 | Lower base wheels |
| 9 | Lower base protrusion wheels |
| 10 | Soft-serve ice cream unit |
| 11 | Compressor |
| 12 | Condenser with cooling fan motor |
| 13 | Beater assembly |
| 14 | Smart relay switch |
| 15 | Control box |
| 21 | Popcorn vending unit frame |
| 22 | Microwave unit door |
| 23 | Acme nut and guide |
| 24 | Acme screw |
| 25 | Drive motor and encoder |
| 26 | Drive motor and encoder |
| 27 | Multi-sectional cavity |
| 28 | Picker |
| 29 | Picker motor with encoder |
| 30 | Encoder motor assembly - travel to dropoff |
| 31 | Encoder motor assembly - front to back |
| 32 | Motorized plank |
| 33 | Vacuum pump |
| 34 | Inverter |
| 35 | Battery bank |
| 36 | Longitudinal motorized kicker |
| 401 | AC controller microprocessor |
| 402 | Ambient temperature sensor |
| 403 | Battery Bank Voltage Sensor |
| 407 | Battery charge control relay |
| 408 | Charger |
| 409 | Battery bank |
| 410 | Inverter |
| 411 | Battery power gate relay |
| 412 | AC power gate relay |
| 415 | Hall effect sensor |
| 416 | High voltage relay control |
| 417 | Outlet |
| 419 | Machine load |
| 430 | Machine controller |
| 432 | Computer |
| 434 | Motor control board |
| 436 | Motor control board |
| 438 | LED board |
| 440 | Emergency relay board |
| 501 | AC controller microprocessor |
| 502 | Ambient temperature sensor |
| 503 | Battery Bank Voltage Sensor |
| 504 | 5 VDC Power Supply |
| 505 | 24 VDC Power Supply |
| 506 | Emergency 24 VDC cutoff relay |
| 507 | Battery charge control relay |
| 508 | Battery charger |
| 509 | Battery bank |
| 510 | Inverter |
| 511 | Battery power gate relay |
| 512 | AC power gate relay |
| 513 | Smart transfer relay |
| 514 | AC relay board |
| 515 | Hall effect sensor |
| 516 | Emergency relay board |
| 517 | Outlet |
| 518 | Voltage monitor |
| 519 | Vending machine (soft serve ice cream) |
| 520 | Compressor & condenser fan motor |
| 521 | Beater motor |
| 601 | AC controller microprocessor |
| 602 | Ambient temperature sensor |
| 603 | Other environmental sensor |
| 604 | 5 VDC power supply |
| 605 | 24 VDC power supply |
| 606 | Emergency cutoff relay |
| 607 | Battery charge control relay |
| 608 | Current sensor |
| 609 | Battery charger |
| 610 | Battery bank |
| 611 | Inverter |
| 612 | Battery power gate relay |
| 613 | Current sensor |
| 614 | AC power gate relay |
| 615 | Current sensor |
| 616 | AC relay board |
| 617 | Emergency relay board |
| 618 | Voltage monitor |
| 619 | Microwave magnetron |
| 620 | Microwave magnetron |
| 621 | Outlet |
| 701 | AC controller microprocessor |
| 702 | Ambient temperature sensor |
| 703 | Other environmental sensor |
| 704 | 5 VDC power supply |
| 705 | 24 VDC power supply |
| 706 | Emergency cutoff relay |
| 707 | Battery charge control relay |
| 708 | Battery charger |
| 709 | Battery bank |
| 710 | Inverter |
| 711 | Battery power gate relay |
| 712 | AC power gate relay |
| 713 | Smart transfer relay |
| 714 | AC relay board |
| 716 | Emergency relay board |
| 717 | Outlet |
| 718 | Voltage monitor |
| 719 | Vending machine |
| 720 | Vending machine |
| 721 | Vending machine |

It will be understood that, while various aspects of the present disclosure have been illustrated and described by way of example, the invention claimed herein is not limited thereto, but may be otherwise variously embodied within the scope of the following claims. For example, it should be understood that use of the disclosed auxiliary A/C power supply system is not limited to vending machines, but may be used with many other high power A/C equipment units having start-up or other short term current demands exceeding the current demand capacity provided by a conventional 110 volt A/C, 15-16 amp service.

The invention claimed is:

1. A system for providing an enhanced power supply to at least one machine, the system comprising:
an A/C interface for electrically coupling the system to a grid-based A/C power source;
an A/C controller comprising a microprocessor and a memory;
a battery plant;
a battery charger;
an inverter having an input coupled to the battery plant;
a charge control device for selectively coupling the battery charger to the grid-based A/C power source;
a battery control device for selectively coupling an output of the inverter to the machine;
an A/C power control device for coupling the grid-based A/C power source to the machine;
a voltage sensor in communication with the A/C controller for monitoring a voltage value for the battery plant; and a first current sensor in communication with the A/C controller for monitoring an A/C current demand placed on the grid-based A/C power source by the machine, wherein the A/C controller is configured upon sensing the current demand to:

operate the charge control device to decouple the battery charger from the grid-based A/C power source, and operate the battery control device to couple the output of the inverter to the machine, wherein the A/C controller is further configured, after a time period having a predetermined duration to:

operate the battery control device to decouple the output of the inverter from the machine, and operate the charge control device to recouple the battery charger to the grid-based A/C power source, wherein the predetermined duration of the time period is determined as a function of a machine type of the machine, and is retrievably stored in the memory of the A/C controller.

2. The system of claim 1, wherein the predetermined duration is further determined as a function of an environmental parameter of the machine.

3. The system of claim 2, further comprising a temperature sensor in communication with the A/C controller for monitoring an ambient temperature of the battery plant, wherein the predetermined duration is further determined as a function of an environmental parameter comprising an ambient temperature of the battery plant.

4. The system of claim 2, further comprising a pressure sensor in communication with the A/C controller, wherein the predetermined duration is further determined as a function of an environmental parameter comprising an altitude of the system.

5. The system of claim 1, wherein the machine comprises an ice cream vending machine.

6. The system of claim 5, further comprising:

a smart transfer relay for selectively coupling one of the battery control device or the A/C power control device to the machine, wherein the A/C controller operates the smart transfer device to decouple the A/C power source from the machine while the inverter is coupled to the machine.

7. The system of claim 1, wherein the machine comprises a popcorn vending machine.

8. The system of claim 7, further comprising:

a second current sensor in communication with the A/C controller for monitoring an A/C current provided to the machine by the inverter;

wherein the battery control device is operative to couple the battery to a first electrical load of the machine, wherein the A/C power control device is operative to couple the A/C power source to a second electrical load of the machine, and wherein the A/C controller operates the charge control device to decouple the battery charger from the A/C power supply and operates the battery control device to couple the inverter to the machine for the predetermined duration upon receiving a signal indicating that the A/C power source is providing a current value to the second electrical load of the machine.

9. The system of claim 8, wherein the predetermined duration for providing the current value by the A/C power source is further determined as a function of the voltage value for the battery plant.

10. The system of claim 9, wherein the predetermined duration for providing the current value by the A/C power source is further determined a function of one or more of the current value or a predetermined environmental parameter.

11. The system of claim 1, wherein the A/C controller is further configured upon operating the battery control device to couple the output of the inverter to the machine to operate the A/C power control device to decouple the grid-based AC power source from the machine.

12. The system of claim 1, wherein the A/C controller is further configured upon operating the battery control device to decouple the output of the inverter from the machine to operate the A/C power control device to recouple the grid-based A/C power source to the machine.

13. A system for providing an enhanced power supply available to a plurality of machines, the system comprising:

an A/C interface for electrically coupling the system to a grid-based A/C power source;

an A/C controller comprising a microprocessor and a memory;

a battery plant;

a battery charger;

an inverter having an input coupled to the battery plant;

a charge control device for selectively coupling the battery charger to the grid-based A/C power source;

a plurality of battery control devices for selectively coupling the inverter to respective ones of the plurality of machines;

a plurality of A/C power control devices for selectively coupling the grid-based AC power source to respective ones of the plurality of machines;

a voltage sensor in communication with the A/C controller for monitoring a voltage value for the battery plant; and a at least one current sensor in communication with the A/C controller for monitoring an A/C current demand placed on the grid-based A/C power source by at least one of the plurality of machines, wherein the A/C controller is configured upon sensing the current demand to:

operate the charge control device to decouple the battery charger from the grid-based A/C power source, and selectively operate one of the battery control devices to couple the inverter to a respective one of the machines, wherein the A/C controller is further configured, after a time period having a predetermined duration to:

operate the battery control device to decouple the output of the inverter from the respective machine, and operate the charger control device to recouple the battery charger to grid-based A/C power source, wherein the predetermined duration of the time period is determined as a function of a machine type of the machine, and is retrievably stored in the memory of the A/C controller.

14. The system of claim 13, wherein the plurality of machines comprise a plurality of vending machines.

15. The system of claim 13, further comprising:

a plurality of smart transfer relays for selectively coupling one of the battery control device or the A/C power control device to the respective ones of the machines, wherein the A/C controller is further configured to operate a respective one of the smart transfer devices to decouple the grid-based A/C power source from the respective one machine while the inverter is coupled to the machine.

16. The system of claim 13, wherein the A/C controller is further configured to operate a respective one of the smart transfer devices to decouple the inverter from the respective one machine while the A/C power source is coupled to the respective, one machine.

\* \* \* \* \*